(12) United States Patent
Higai et al.

(10) Patent No.: US 11,975,764 B2
(45) Date of Patent: May 7, 2024

(54) AUTOMOTIVE FRAME PART

(71) Applicant: JFE STEEL CORPORATION, Tokyo (JP)

(72) Inventors: Kazuhiko Higai, Tokyo (JP); Tsuyoshi Shiozaki, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 402 days.

(21) Appl. No.: 17/419,365

(22) PCT Filed: Sep. 6, 2019

(86) PCT No.: PCT/JP2019/035188
§ 371 (c)(1),
(2) Date: Jun. 29, 2021

(87) PCT Pub. No.: WO2020/152904
PCT Pub. Date: Jul. 30, 2020

(65) Prior Publication Data
US 2022/0081038 A1    Mar. 17, 2022

(30) Foreign Application Priority Data

Jan. 23, 2019   (JP) .................................. 2019-009075

(51) Int. Cl.
*B62D 29/00*    (2006.01)
*B62D 21/15*    (2006.01)
(Continued)

(52) U.S. Cl.
CPC ......... *B62D 29/005* (2013.01); *B62D 29/002* (2013.01); *B62D 21/157* (2013.01); *B62D 25/04* (2013.01); *B62D 25/20* (2013.01)

(58) Field of Classification Search
CPC .. B62D 21/157; B62D 29/005; B62D 29/001; B62D 29/002
See application file for complete search history.

(56) References Cited

U.S. PATENT DOCUMENTS 5,992,923 A * 11/1999 Wycech ............... B62D 29/002
280/805
6,168,226 B1 * 1/2001 Wycech ................ B60K 17/22
296/187.02
(Continued)

FOREIGN PATENT DOCUMENTS

CN    103158781 A    6/2013
CN    103974875 A    8/2014
(Continued)

OTHER PUBLICATIONS

Nov. 12, 2019 International Search Report issued in International Patent Application No. PCT/JP2019/035188.
(Continued)

*Primary Examiner* — Jason S Morrow
(74) *Attorney, Agent, or Firm* — Oliff PLC

(57) ABSTRACT

An automotive frame part is provided to a side portion of an automotive body and absorbs crashworthiness energy by bending upon receiving a crashworthiness load from a side of the automotive body. The automotive frame part includes: a member having a hat-shaped cross section or a U-shaped cross section and including a top portion, and a pair of side wall portions that are continuous from the top portion via punch shoulder R portions; and resin that is coated on or patched to an internal surface of the member having the hat-shaped cross section member or the U-shaped cross section. The resin extends at least to a predetermined range toward the top portion and the side wall portions on both sides of the punch shoulder R portions, and is adhered, after heating, to the internal surface at an adhesive strength of 10 MPa or higher at a room temperature.

3 Claims, 10 Drawing Sheets

(51) Int. Cl.
*B62D 25/04* (2006.01)
*B62D 25/20* (2006.01)

(56) References Cited

U.S. PATENT DOCUMENTS

| | | | |
|---|---|---|---|
| 6,474,726 B1 | 11/2002 | Hanakawa et al. | |
| 7,318,873 B2* | 1/2008 | Czaplicki | B29C 70/70 |
| | | | 296/187.02 |
| 10,703,417 B2* | 7/2020 | Yokoi | B62D 29/002 |
| 10,850,772 B2* | 12/2020 | Kurokawa | B62D 29/048 |
| 10,882,569 B2* | 1/2021 | Suzumura | B62D 25/025 |
| 11,565,757 B2* | 1/2023 | Qian | B62D 29/002 |
| 2010/0028651 A1* | 2/2010 | Golden | C08L 63/00 |
| | | | 428/317.5 |
| 2010/0092733 A1* | 4/2010 | Blank | B29C 66/742 |
| | | | 156/60 |
| 2013/0106138 A1 | 5/2013 | Brockhoff et al. | |
| 2013/0187410 A1 | 7/2013 | Wawers | |
| 2014/0319874 A1 | 10/2014 | Matsuda | |
| 2016/0016609 A1 | 1/2016 | Kurokawa | |
| 2017/0036701 A1 | 2/2017 | Yamada et al. | |
| 2019/0144041 A1* | 5/2019 | Belpaire | B62D 29/008 |
| | | | 296/209 |
| 2022/0081033 A1* | 3/2022 | Higai | B60R 19/18 |
| 2022/0089223 A1* | 3/2022 | Higai | B62D 21/15 |
| 2022/0258804 A1* | 8/2022 | Higai | B62D 29/007 |
| 2023/0219623 A1* | 7/2023 | Higai | B62D 29/004 |
| | | | 296/187.03 |
| 2023/0257899 A1* | 8/2023 | Higai | F16F 7/124 |
| | | | 428/34.1 |

FOREIGN PATENT DOCUMENTS

| | | |
|---|---|---|
| CN | 105008210 A | 10/2015 |
| EP | 1074457 A2 | 2/2001 |
| EP | 1387789 | 2/2004 |
| JP | 2000-318075 A | 11/2000 |
| JP | 2001-048052 A | 2/2001 |
| JP | 2001-48054 A | 2/2001 |
| JP | 2001-088740 A | 4/2001 |
| JP | 2003-226261 A | 8/2003 |
| JP | 2006-240134 A | 9/2006 |
| JP | 2009-61864 A | 3/2009 |
| JP | 2017-30678 A | 2/2017 |
| JP | 2018-144529 A | 9/2018 |

OTHER PUBLICATIONS

Feb. 10, 2022 Search Report issued in European Patent Application No. 19911319.2.
Oct. 31, 2022 Office Action Issued in Chinese Patent Application No. 201980089639.2.

* cited by examiner (a) LOAD-STROKE CURVE (b) EXTERNAL VIEW OF TEST SPECIMEN (a) LOAD-STROKE CURVE (b) EXTERNAL VIEW OF TEST SPECIMEN

AUTOMOTIVE FRAME PART

FIELD

The present invention relates to an automotive frame part for an automobile, and, particularly to an automotive frame part that absorbs crashworthiness energy by bending upon receiving a crashworthiness load from a side of the automotive body.

BACKGROUND

As techniques for improving the absorptive properties of automobiles, there have been many techniques for optimizing the shape, the structure, the material, and the like of the automotive parts. Furthermore, recently there has been an increased number of disclosures related to techniques for filling the internal of an automotive part having a closed cross section shape, with resin or the like in a foamed condition (e.g., foamed resin), in order to ensure a balance between the absorptive properties of the automotive part and a weight reduction of the automotive body.

For example, Patent Literature 1 discloses a technique for improving stiffness and collision safety of an automotive body by improving bending strength and torsional stiffness, while minimizing an increase in the weight, of an automotive structural part, such as a side sill, a floor member, or a pillar, having inside a closed space formed by placing a flange in a manner aligned with a top portion of a hat-shaped cross section part, by filling the internal space of the automotive structural part with a foamed foaming filler material.

Moreover, Patent Literature 2 discloses a technique, when the internal space of the closed cross section shape of a pillar or the like is filled with a highly stiff foamed body, the closed cross section shape being achieved by disposing parts with a hat-shaped cross section in a manner facing each other, with their flange portions in contact with each other, for fixing a highly stiff foamed body using a compressive counterforce generated in the process of foaming and filling the foamed body, to improve their strength, stiffness, and impact energy absorptiveness, while improving the vibration isolating performance for suppressing the communication of vibration sound.

CITATION LIST

Patent Literature

Patent Literature 1: Japanese Patent Application Laid-open No. 2006-240134
Patent Literature 2: Japanese Patent Application Laid-open No. 2000-318075

SUMMARY

Technical Problem

With the techniques disclosed in Patent Literature 1 and Patent Literature 2, by filling a foamed filler material or a foaming body inside the automotive part, it is possible to improve the strength against bending deformations and the impact energy absorptiveness of the automotive part, and, furthermore, to improve the stiffness against torsional deformations, so that the deformations of the automotive part can be suppressed.

However, for automotive frame parts such as a pillar (e.g., A pillar and B pillar), a locker (side sill), and a roof rail that absorb the crashworthiness energy by going through a buckling deformation when the part bends in a direction intersecting with its longitudinal direction upon receiving a crashworthiness load from a side of the automotive body, there has been a drawback that the crashworthiness energy absorptive performance cannot be improved as expected even with the use of the techniques in which foamed resin is filled inside of the automotive frame part, because a member making up the part fractures in the process of bending caused by a collision.

The present invention is made to address such a drawback, and an object of the present invention is to provide an automotive frame part that is provided to a side portion of an automotive body, and is capable of increasing the crashworthiness energy absorbed by bending of the automotive frame part upon receiving a crashworthiness load from a side of the automotive body.

Solution to Problem

An automotive frame part according to the present invention is provided to a side portion of an automotive body and absorbs crashworthiness energy by bending upon receiving a crashworthiness load from a side of the automotive body, the automotive frame part including: a member having a hat-shaped cross section or a U-shaped cross section, the member including a top portion, and a pair of side wall portions that are continuous from the top portion via punch shoulder R portions; and resin that is coated on or patched to an internal surface of the member having the hat-shaped cross section member or the U-shaped cross section, wherein the coated or patched resin extends at least to a predetermined range toward the top portion and the side wall portions on both sides of the punch shoulder R portions, and the coated or patched resin is adhered, after heating, to the internal surface at an adhesive strength of 10 MPa or higher at a room temperature.

The above-described automotive frame part according to the present invention includes a release prevention member that is disposed, in order to prevent the resin from being released from the internal surface, in a manner straddling over the top portion and covering a surface of the resin, and that has both ends joined to internal surfaces of the pair of side wall portions, wherein the resin adheres also to the release prevention member at an adhesive strength of 10 MPa or higher at the room temperature.

Advantageous Effects of Invention

According to the present invention, it is possible to prevent fractures and improve buckling strength, during a bending process, of a hat-shaped cross section member or a U-shaped cross section member that is configured to absorb a crashworthiness energy by bending upon receiving a crashworthiness load from a side of the automotive body, thereby improving the crashworthiness energy absorptive performance.

DESCRIPTION OF EMBODIMENTS

Automotive frame parts according to a first embodiment and a second embodiment of the present invention will now be explained with reference to FIGS. 1 to 9. In the description herein and drawings, the elements having substantially the same functions and configurations are assigned with the same reference signs, and explanations thereof will be omitted.

First Embodiment

Figure 1:
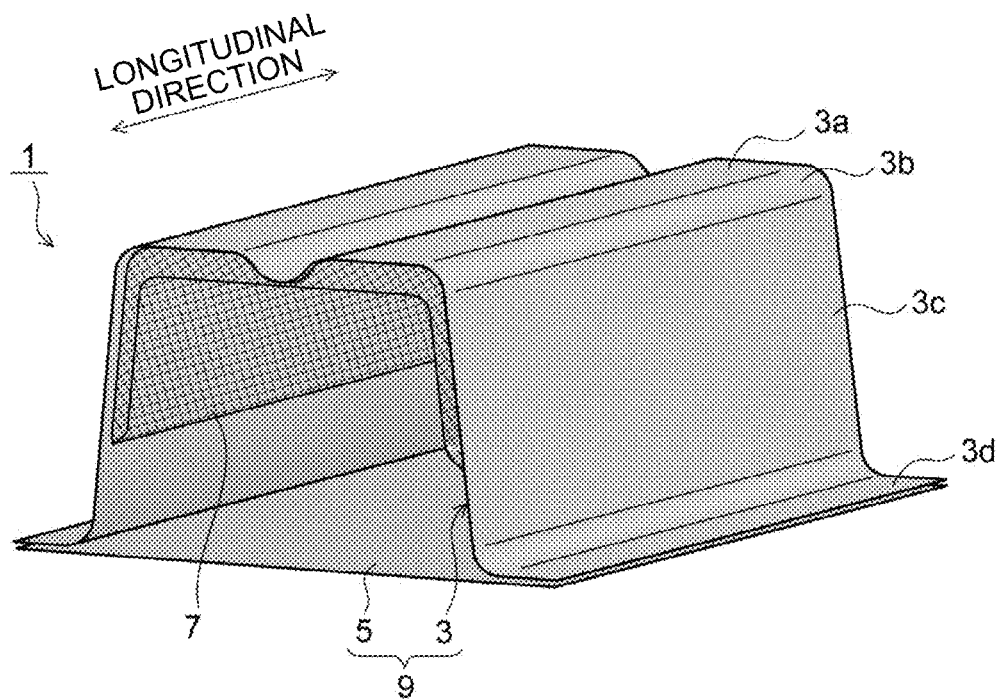
FIG. 1 is a perspective view illustrating an automotive frame part according to a first embodiment of the present invention.
Figure 2:
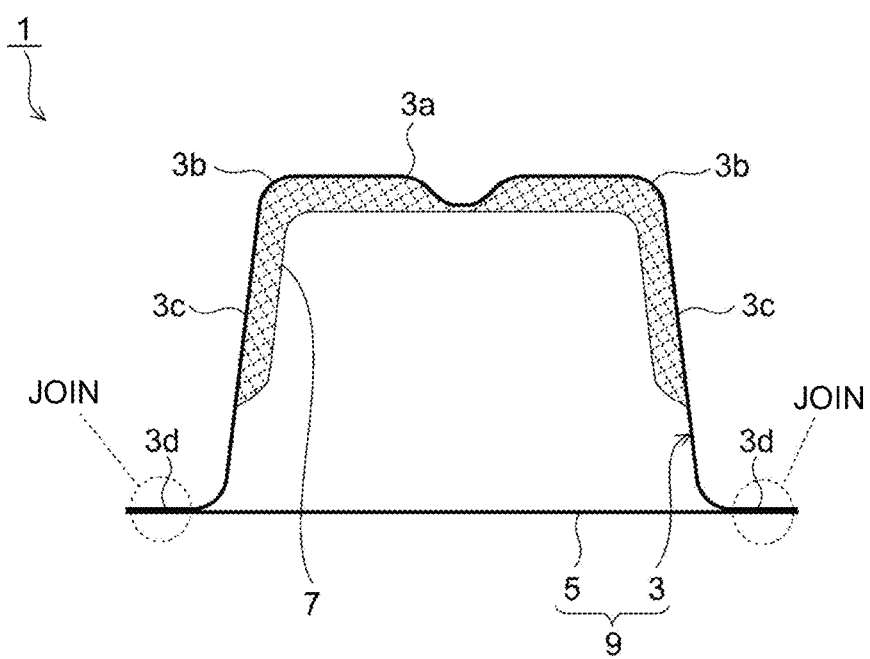
FIG. 2 is a cross-sectional view illustrating the automotive frame part according to the first embodiment of the present invention.

An automotive frame part 1 according to the first embodiment of the present invention is provided to a side portion of an automotive body, is designed to absorb crashworthiness energy upon receiving a crashworthiness load from a side of the automotive body, by bending in a direction intersecting with the longitudinal direction, and includes an outer part 3, an inner part 5, and resin 7 that is coated on the internal surface of the outer part 3, as illustrated in FIGS. 1 and 2.

The outer part 3 is a member made from a metal sheet and having a hat-shaped cross section, and has a top portion 3a, and a pair of side wall portions 3c that are continuous from the top portion 3a via punch shoulder R portions 3b, and flange portions 3d that are continuous from the respective side wall portions 3c.

The inner part 5 is a flat plate-like member made from a metal sheet and having a flat plate-like shape. The side ends of the inner part 5 are joined to the flange portions 3d of the outer part 3, respectively, and a tubular member 9 is formed thereby.

The automotive frame part 1 including the hat-shaped cross section member such as the outer part 3 is a part making up an automotive frame. The present invention is intended for an automotive frame part 1 making up the automotive frame, by being disposed at the left or the right part of the side portions of the automotive body. Specifically, examples thereof include an A pillar and a B pillar disposed in a manner stretching in up-and-down directions of the automotive body, and a locker (side sill) and a roof rail that are disposed in a manner stretching in front-and-back directions of the automotive body.

Examples of the types of the metal sheet used for the outer part 3 and the inner part 5 include a cold-rolled steel sheet, a hot-rolled steel sheet, a stainless steel sheet, a zinc-based coating steel sheet, a zinc alloy coating steel sheet, an aluminum alloy coating steel sheet, and an aluminum alloy sheet.

As illustrated in FIGS. 1 and 2, the internal surfaces of the top portion 3a, the punch shoulder R portions 3b, and the side wall portions 3c of the outer part 3 are coated with the resin 7. The coating of the resin 7 has a thickness equal to or smaller than 8 mm after heating, and adheres to the internal surface of the outer part 3 at an adhesive strength of 10 MPa or higher at the room temperature.

Examples of the types of the resin 7 include thermoplastic resin, thermoset resin, and elastomer resin. Examples of thermoplastic resin includes vinyl resin (such as vinyl acetate and vinyl chloride), acrylic resin, polyamide resin, polystyrene resins, and cyanoacrylate resin. Examples of thermoset resin includes epoxy resin, urethane resin, ester resin, phenolic resin, melamine resin, and urea resin. Examples of the elastomer resin includes nitro rubber resin, styrene butadiene rubber resin, modified silicone resin, butyl rubber resin, urethane rubber resin, and acrylic rubber resin. Among the resins of any of these types, those that do not fracture or collapse in the process of a bending deformation are preferable.

By subjecting the resin 7 coated on the internal surface of the outer part 3 to a heat treatment, the resin 7 can be caused to adhere to the outer part 3 by the adhesive capacity of the resin 7 itself. In such a case, by subjecting the resin 7 and the outer part 3 to a heat treatment over a predetermined time period at a predetermined temperature, an adhesive strength between the resin 7 and the outer part 3 can be maintained at 10 MPa or higher even after cooling down to the room temperature. The temperature and the time period used in the heat treatment may be adjusted as appropriate, depending on the type of the resin 7.

The adhesive strength between the resin 7 and the outer part 3 may be set to a maximum sheared stress or an average sheared stress acting on the interface between the metal sheet and the resin. The maximum sheared stress or the average sheared stress may be acquired by, for example, executing a crashworthiness test to a double-layered square column including resin adhering to a metal sheet (e.g., a steel sheet), obtaining a boundary condition where the resin 7 peels off, and executing a crashworthiness analysis based on the boundary condition.

The adhesive strength between the resin 7 and the outer part 3 may also be acquired by cutting out a part of the resin 7 and the outer part 3 after adhesion to each other, installing the cut resin 7 and outer part 3 in a tensile testing machine with the resin 7 pinched on one side and the outer part 3 pinched on the other side, and pulling the resin 7 and the outer part 3. For the adhesive strength between the resin 7 and the outer part 3, it is also possible to use a measurement measured using a method of cutting a part of the resin 7 and the outer part 3 after adhesion to each other, installing the part in the tensile testing machine with the resin 7 pinched on one side and a handle portion (not illustrated) held on the other side, the handle portion being formed by bending the outer part 3 made of a metal sheet, and pulling the resin 7 and the handle portion. It is also possible to use a measurement measured using a method of joining a handle part to the outer part 3, and holding and pulling the handle part with a tensile testing machine.

For an automotive frame part including the tubular member 9 formed by joining the outer part 3 and the inner part 5, such as the automotive frame part 1 according to the first embodiment, the adhesive strength between the resin 7 and the outer part 3 may also be measured by cutting out a part of the resin 7 and the tubular member 9, and installing the part in the tensile testing machine.

The following explains the reason that the crashworthiness energy absorptive performance is improved by allowing the automotive frame part 1 according to the first embodiment to bend and to absorb a crashworthiness load applied to a side of the automotive body.

A conventional automotive frame part including a hat-shaped cross section member made from a metal sheet such as a steel sheet absorbs the crashworthiness energy in a process in which a crashworthiness load is received in a direction intersecting with the longitudinal direction of the hat-shaped cross section member, in which the hat-shaped cross section member starts going through a bending deformation and exceeds its buckling strength (the crashworthiness load at which buckling takes place), in which the top portion is stretched in an intersecting direction and the longitudinal direction, in which the angles of the side wall portions change, and in which the side wall portions bend (bending crush process).

Figure 3:
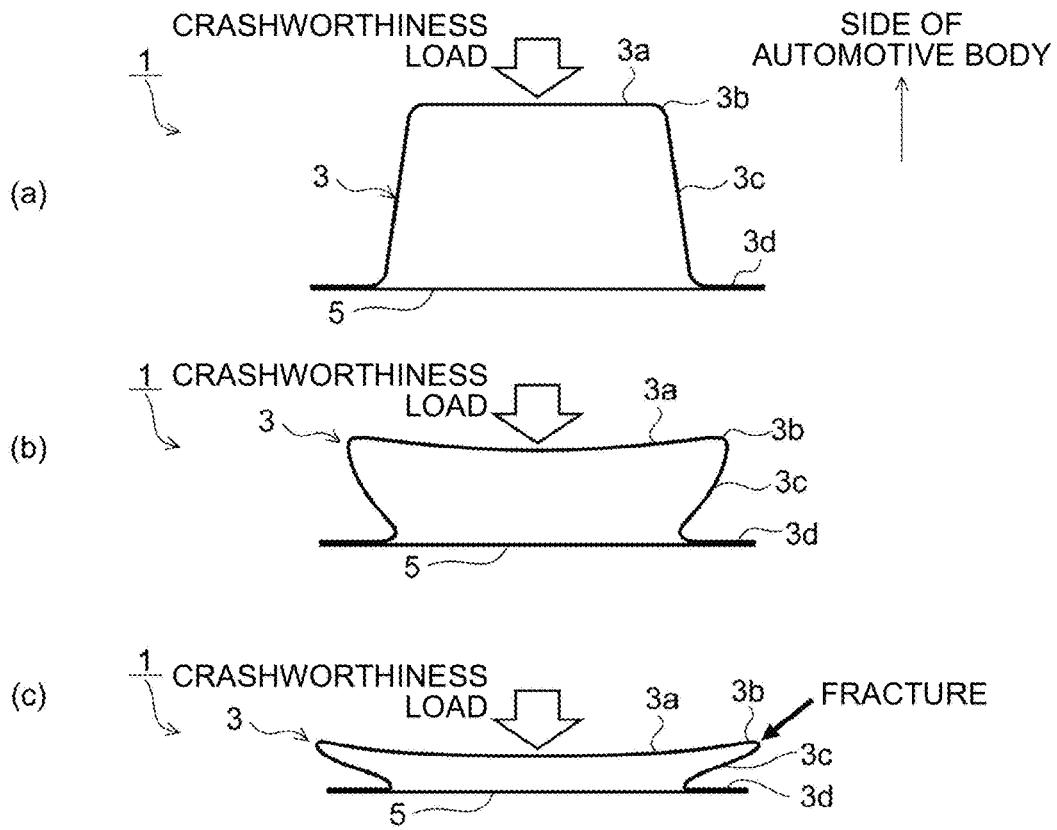
FIG. 3 is a schematic illustrating a cross-sectional shape of bending portions of the automotive frame part, when a crashworthiness load is applied to the automotive frame part from a side of the automotive body.
Figure 4:
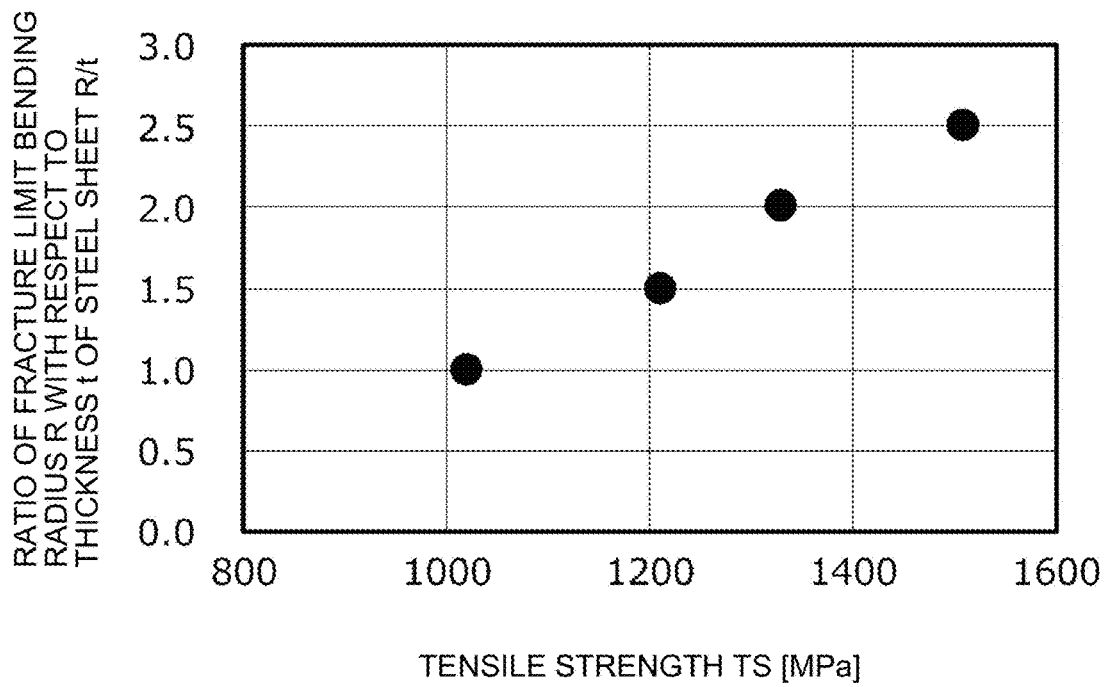
FIG. 4 is a graph indicating a relation between the tensile strength level of a steel sheet, and a ratio of the fracture limit bending radius of the steel sheet with respect to the thickness of the steel sheet.
Figure 5:
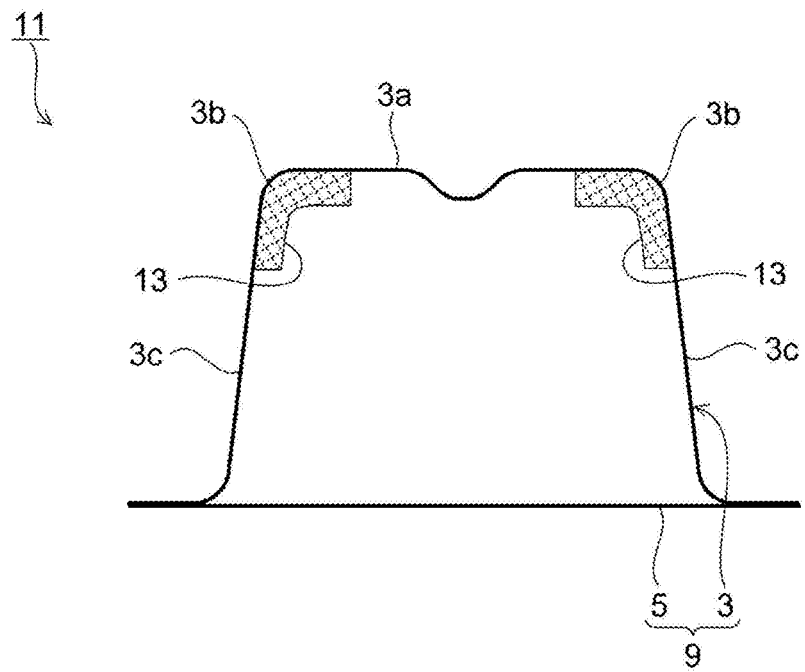
FIG. 5 is a cross-sectional view illustrating first another mode of the automotive frame part according to the first embodiment of the present invention.

FIG. 3 is a schematic of a cross-sectional shape of portions that bend in the process in which a crashworthiness load is applied to the top portion 3a of the outer part 3 that is the hat-shaped cross section member, and the automotive frame part 1 bends (see FIG. 17(b) to be referred in some examples which will be described later). As illustrated in FIG. 3, when a crashworthiness load is applied to the top portion 3a, the side wall portions 3c are crushed in such a manner that portions of the side wall portions 3c on the side of the top portion 3a are pushed outwards in directions toward the flange portions 3d, and therefore the bending radius of the punch shoulder R portions 3b connecting the top portion 3a and the side wall portions 3c becomes significantly smaller.

In this process, the crashworthiness energy is most likely to be absorbed when the outer part 3 bends without fracturing. However, if the outer part 3 fractures in the process of bending, a deformation resistance against the bending is reduced, and the outer part 3 bends easily. As a result, absorption of the crashworthiness energy falls short, and the outer part 3 can no longer exhibit its original performance.

In the outer part 3 that is the hat-shaped cross section member, the punch shoulder R portions 3b connecting the top portion 3a and the side wall portions 3c are the portions having high crashworthiness energy absorptive performance in the process in which the hat-shaped cross section member bends. However, because the bending radius of the punch shoulder R portions 3b becomes smaller in the process in which the outer part 3 bends, as illustrated in FIG. 3, the stress concentrates on the outer surface of the punch shoulder R portions 3b, and the punch shoulder R portions 3b becomes more likely to fracture. In particular, when the outer part 3 is a hat-shaped cross section member formed by press forming, the punch shoulder R portions 3b are the portions that are most likely to go through a plastic deformation, and that had gone through work hardening in the process of the press forming. As a result, the punch shoulder R portions 3b are more likely to fracture, compared with other portions such as the top portion 3a and the side wall portions 3c, because of the reduced ductility due to the work hardening having taken place at the time of the press forming.

Furthermore, because a high-strength steel sheet, which is used in an automotive part in order to balance the crashworthiness property with a weight reduction of the automotive body, has lower ductility, compared with that of a steel sheet with a conventional strength. According to a relation between the level of a steel sheet strength and a fracture limit bending radius R/thickness t (see Cited Literature 1 below) of a steel sheet, as indicated in Table 1 and FIG. 4, an increase in the tensile strength TS of a steel sheet increases the likeliness of the steel sheet fracturing at the same thickness and a larger bending radius.

Therefore, when an automotive frame part including a hat-shaped cross section member using a high-strength steel sheet bends, the punch shoulder R portions of the hat-shaped cross section member become more likely to fracture, as the steel sheet strength is increased.

(Cited Literature 1) HASEGAWA Kohei, KANEKO Shinjiro, SETO Kazuhiro, "Cold-rolled and Galvannealed (GA) High Strength Steel Sheets for Automotive Cabin Structure", JFE GIHO, No. 30 (August 2012), p. 6-12.

TABLE 1

| Steel Sheet Strength Level | TS [MPa] | R/t [—] |
| --- | --- | --- |
| 780-MPa Class | 810 | Less than 1.0 |
| 980-MPa Class | 1020 | 1.0 |
| 1180-MPa Class | 1210 | 1.5 |
| 1320-MPa Class | 1330 | 2.0 |
| 1470-MPa Class | 1510 | 2.5 |

As a result, in the application of a high-strength steel sheet to an automotive frame part, fracturing has been a factor obstructing any further advancement in the improvement of a steel sheet strength. To address this issue, by focusing on the fact that the punch shoulder R portions 3b of the outer part 3 that is the hat-shaped cross section member fracture because of the bending radius becoming equal to or smaller than a small fracture limit bending radius that is unique to the metal sheet, as described above, the inventors of the present invention have come up with an idea that fracturing can be avoided if the bending radius of the punch shoulder R portions 3b can be increased during the process in which the outer part 3 bends at the time of a collision.

In other words, by interposing an object between the metal sheets of the punch shoulder R portions 3b, and allowing the object to be nipped and compressed therebetween in the process in which the outer part 3 bends, it is possible to prevent the bending radius of the punch shoulder R portions 3b from becoming equal to or smaller than the fracture limit bending radius. However, because the weight of the part is increased by adding an object interposed between the metal sheets, it is preferable for the interposed object to be light-weighted as much as possible.

Therefore, in the present invention, the resin 7 is caused to adhere to the internal surface of at least the punch shoulder R portions 3b and portions extending on both sides thereof in the outer part 3, so that the resin is nipped between the metal sheets in the portions where the bending radius becomes smaller in the bending process. In this manner, with the resin 7 nipped, it is possible to ensure that the bending radius of the punch shoulder R portions 3b remains larger than the fracture limit bending radius that is unique to the metal sheet, and to prevent fracturing in the bending portions in the outer part 3. As a result, the crashworthiness energy absorptive performance can be improved.

However, if the adhesive strength between the resin 7 and the internal surface of the outer part 3 is low, the resin 7 coated on the internal surface of the outer part 3 peels off and is released during a process immediately after the outer part 3 starts going through a bending deformation by receiving a crashworthiness load, to the end of the bending. As a result, the resin 7 can no longer remain nipped between the metal sheets of the punch shoulder R portions 3b during this bending process, and fracturing occurs, and the deformation resistance deteriorates. Hence, improvements in the absorptive properties are obstructed.

To address this issue, the inventors of the present invention conducted examinations by changing the adhesive strength of the resin 7 coated on the internal surface of the outer part 3, and found out that, if the resin 7 adheres at an adhesive strength of 10 MPa or higher at the room temperature, the resin 7 bends together with the outer part 3 without peeling off and becoming released from the internal surface of the outer part 3.

By coating the resin 7 and ensuring an adhesive strength of 10 MPa or higher, the resin 7 is nipped between the metal sheets in the punch shoulder R portions 3b during the bending process. In this manner, it is possible to prevent the bending radius of the punch shoulder R portions 3b from becoming smaller than the fracture limit bending radius unique to the metal sheet, and to prevent fracturing of the metal sheets.

Furthermore, the punch shoulder R portions 3b of the outer part 3 are portions having high crashworthiness energy absorptive performance. Therefore, by coating with the resin 7 the internal surface of the portions on both sides of the punch shoulder R portions 3b of the outer part 3, it is possible to improve the buckling strength exerted before the outer part 3 starts bending.

As described above, the automotive frame part 1 according to the first embodiment can improve the crashworthiness energy absorptive performance by preventing deterioration of the deformation resistance against the bending, and improving the buckling strength, during the process from when the automotive frame part 1 starts going through a bending deformation upon receiving a crashworthiness load from a side and to when the automotive frame part 1 bends.

In the present invention, if the entire space inside the closed cross section of the tubular member 9 formed by joining the outer part 3 and the inner part 5 is filled with the resin, as having been practiced conventionally, the cross-sectional area and the volume in the tubular member 9 is reduced when collision occurs, and the resin is not compressed immediately in response to the reduction in the volume. As a result, the resin spurts out by destroying the joined part, degrading the crashworthiness energy absorptive performance. Therefore, for the reasons described above, the resin may be provided in a space formed on the internal surface side of the hat-shaped cross section member. In order to prevent fracturing in the process of bending, it is necessary for a resin 13 to be provided to the punch shoulder R portions 3b connecting the top portion 3a and the side wall portions 3c of the outer part 3, and to the portions extending on both sides of the punch shoulder R portions 3b toward the top portion 3a and the side wall portions 3c, as in an automotive frame part 11 illustrated in FIG. 5. At this time, as the range by which the resin 13 is extended toward the top portion 3a and the side wall portion 3c, it is preferable for the range to be approximately 5 mm to 20 mm, and more preferably approximately 10 mm, from the R tangent end of the punch shoulder R portion 3b toward each of the top portion 3a and the side wall portion 3c.

Figure 6:
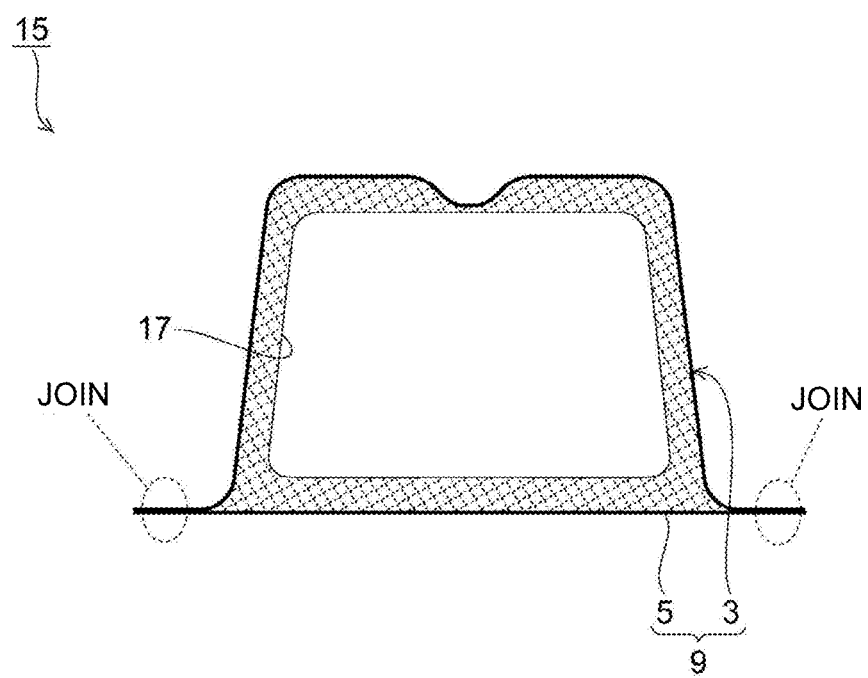
FIG. 6 is a cross-sectional view illustrating second another mode of the automotive frame part according to the first embodiment of the present invention.

Of course, the effects of improving the buckling strength and preventing fractures of the outer part 3 can be achieved even with an automotive frame part 15 in which the entire perimeter of the peripheral wall of the space with the closed cross section in the tubular member 9 is formed by coating the entire internal surfaces of the outer part 3 and the inner part 5 with the resin 17, as illustrated in FIG. 6. In such a configuration, too, the resin is caused to adhere to the peripheral wall portions, instead of filling the entire space with the closed cross section with the resin.

As described above, in the automotive frame part 1 according to the first embodiment, the internal surface of the outer part 3 is coated with the resin 7 in such a manner that the thickness of the resin 7 after adhesion thereto becomes equal to or smaller than 8 mm, but the present invention may also have a structure in which plate-like resin having a thickness equal to or smaller than 8 mm is patched to the internal surface of a tubular member using an adhesive agent. Furthermore, it is also possible to use a structure in which film-like resin having a thickness of approximately 100 μm, the thickness being like that of the laminate of a laminated steel sheet, is patched to the internal surface of a tubular member. It is necessary for such plate-like resin or film-like resin to exhibit an adhesive strength of 10 MPa or higher at the room temperature, with respect to the internal surface of the tubular member.

According to the explanation above, the automotive frame part 1 according to the first embodiment includes the tubular member 9 having a tubular shape achieved by joining the flange portions 3d of the outer part 3 to the side ends of the inner part 5, respectively. It should be needless to say that the automotive frame part according to the present invention is not limited to the tubular member 9 formed with the outer part 3 and the inner part 5, and may also be a part including only the outer part 3. Furthermore, although, according to the explanation above, the outer part 3 is explained to be a hat-shaped cross section member, the present invention may also be a U-shaped cross section member having a top portion, and a pair of side wall portions that are continuous from the top portion via the punch shoulder R portions.

Second Embodiment

The automotive frame part 1 according to the first embodiment is designed to prevent the resin 7 from being released from the internal surface of the outer part 3 during the process in which the automotive frame part 1 bends upon receiving a crashworthiness load, by setting the adhesive strength between the internal surface of the outer part 3 that is the hat-shaped cross section member and the resin 7 to 10 MPa or higher at the room temperature, but, in addition to the adhesive strength, the inventors of the present invention examined an additional way to prevent the resin 7 from being released so that the crashworthiness energy absorptive performance is not deteriorated because of the resin 7 being released at the time of bending due to a collision.

Figure 7:
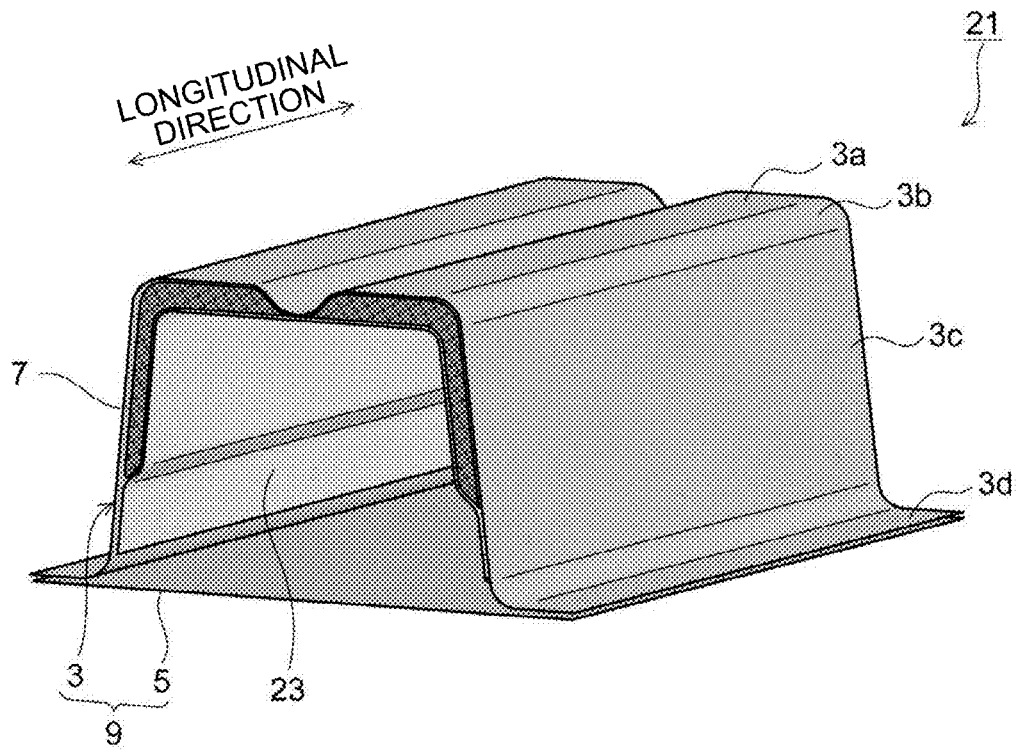
FIG. 7 is a perspective view illustrating an automotive frame part according to a second embodiment of the present invention.
Figure 8:
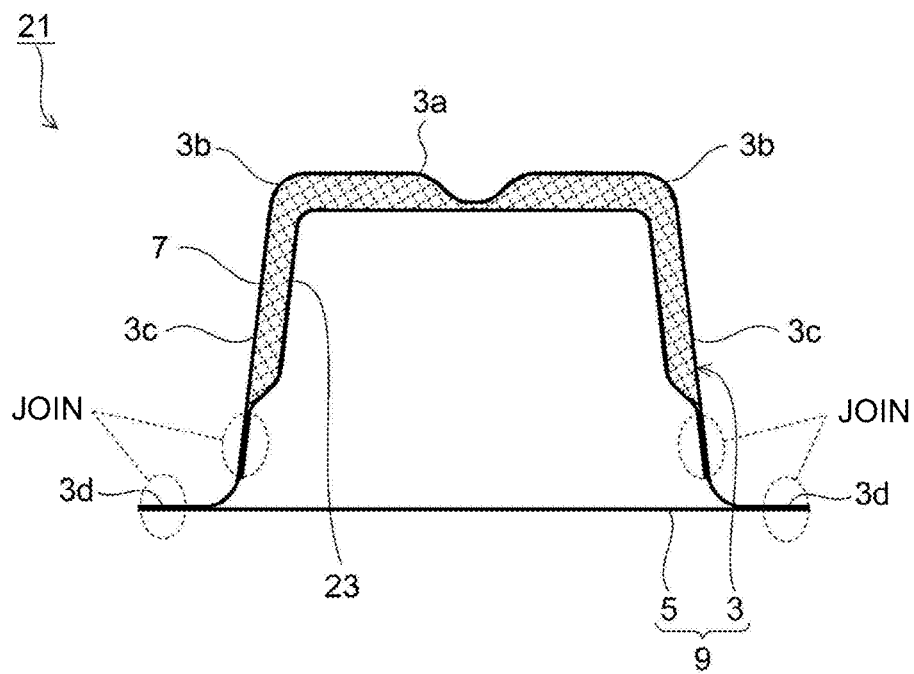
FIG. 8 is a cross-sectional view illustrating the automotive frame part according to the second embodiment of the present invention.

To address this issue, an automotive frame part 21 according to the second embodiment of the present invention includes, as illustrated in FIGS. 7 and 8, a release prevention member 23, in addition to the outer part 3 that is the hat-shaped cross section member, the flat plate-like inner part 5, and the resin 7. The outer part 3, the inner part 5, and the resin 7 are the same as those in the automotive frame part 1 according to the first embodiment described above.

The release prevention member 23 is made from a metal sheet (e.g., a steel sheet), and disposed between the outer part 3 and the inner part 5, in a manner straddling over the top portion 3a and covering the surface of the resin 7, as illustrated in FIG. 8, and has both ends joined (e.g., spot-welded) to the internal surfaces of the pair of side wall portions 3c of the outer part 3.

Because the resin 7 is needed at least in the portions connecting the top portion 3a and the side wall portions 3c, and it is preferable to keep only the weight of the automotive frame part low as much as possible and to keep the height of the vertical walls of the resin 7 and the release prevention member 23 (the range of coating on the side wall portions 3c) short, the release prevention member 23 is joined to the side wall portions 3c of the outer part 3.

Furthermore, the adhesive strength between the resin 7, the outer part 3, and the release prevention member 23 may be calculated by performing a crashworthiness analysis of a double-layered square column including resin adhering to a metal sheet (e.g., a steel sheet), in the same manner as in the first embodiment described above, or by cutting out a part of the resin, tubular member, and release prevention member after adhesion to one another, and measuring the adhesive strength using a tensile testing machine at the room temperature.

As described above, the automotive frame part 21 according to the second embodiment includes the resin 7 coated on the internal surface of the outer part 3, but the present invention may also have a structure in which plate-like resin is patched to the internal surface of the outer part using an adhesive agent. Furthermore, it is also possible to use a structure in which film-like resin having a thickness of approximately 100 μm, the thickness being like that of the laminate of a laminated steel sheet, is patched to the internal surface of the outer part. The adhesive strength between the plate-like or the film-like resin and the internal surface of a tubular member may then be set to 10 MPa or higher at the room temperature.

In the automotive frame part 21 according to the second embodiment, the resin 7 is prevented from being released from the internal surface of the outer part 3 during the process in which the outer part 3 bends, in the same manner as in the automotive frame part 1 according to the first embodiment. In this manner, by ensuring that the resin 7 is nipped on the internal side of the punch shoulder R portions 3b in the bending portions of the outer part 3, thereby effectively preventing the bending radius of the punch shoulder R portions 3b from reaching a size equal to or smaller than the fracture limit bending radius, the automotive frame part 21 according to the second embodiment can prevent the outer part 3 from fracturing during the bending process, and improve the absorptive properties. Because the release prevention member 23 is only intended to prevent the resins from being released, the release prevention member 23 is not required to have such high material strength, and it is possible to use a less strong member than the outer part 3 or the inner part 5.

Furthermore, if a highly strong member is used as the release prevention member 23, by providing the release prevention member 23, in addition to the elements of the automotive frame part 1 according to the first embodiment described above, it is possible to improve the stiffness against a bending deformation caused by a crashworthiness load applied from a side of the automotive frame part 21.

Figure 9:
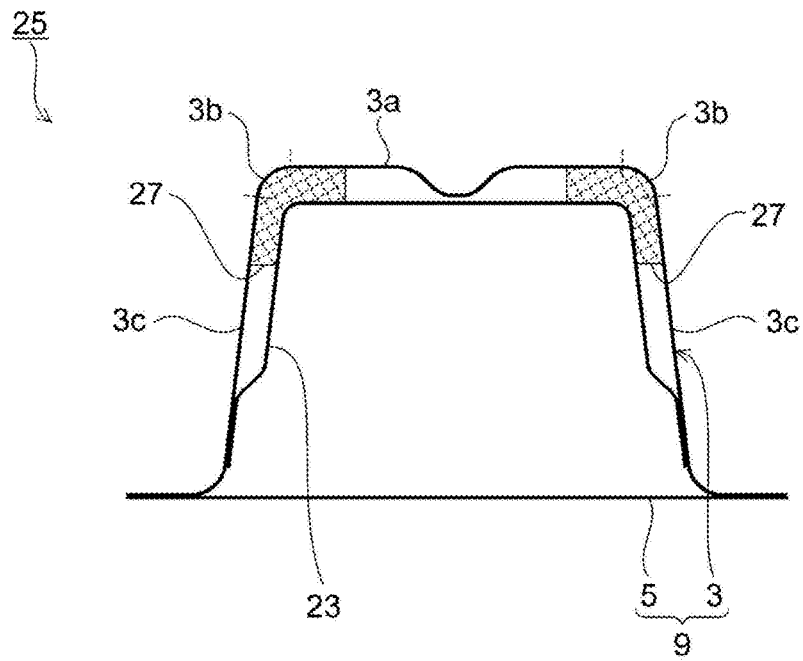
FIG. 9 is a cross-sectional view illustrating another mode of the automotive frame part according to the second embodiment of the present invention.

In the automotive frame part 21 illustrated in FIG. 8, the resin 7 is coated on a portion including the punch shoulder R portions 3b of the outer part 3 in a manner straddling over the top portion 3a, but the present invention may include resin 27 coated on the punch shoulder R portions 3b of the outer part 3, in a manner extending toward the top portion 3a and the side wall portions 3c by a certain range, as an automotive frame part 25 illustrated in FIG. 9.

Even with such an automotive frame part 25 in which the outer part 3 is coated with the resin 27, and the resin 27 is caused to adhere to the outer part 3 and the release prevention member 23 at an adhesive strength of 10 MPa or higher, it is possible to prevent the punch shoulder R portions 3b from bending at a radius equal to or smaller than the fracture limit bending radius due to the resin 27 released from the outer part 3 during the process of bending and being not able to remain between the metal sheets of the punch shoulder R portions 3b, and to improve the crashworthiness energy absorptive performance.

Furthermore, although explained above is the automotive frame part 21 in which the internal surface of the outer part 3 is coated with the resin 7, even with an automotive frame part in which plate-like or film-like resin is patched to the internal surface of a hat-shaped cross section member at an adhesive strength of 10 MPa or higher, it is possible to achieve the same effects as that achieved by the automotive frame part 21 according to the second embodiment.

Furthermore, although the automotive frame part 21 according to the second embodiment includes the tubular member 9 having a tubular shape achieved by joining the flange portions 3d of the outer part 3 to the side ends of the inner part 5, an automotive frame part may include the outer part 3 alone. Furthermore, although, according to the explanation above, the outer part 3 is a hat-shaped cross section member having a hat-shape cross section, the present invention may also be a U-shaped cross section member having a top portion, and a pair of side wall portions that are continuous from the top portion via the punch shoulder R portions.

EXAMPLES

Experiments were carried out to confirm the effects of the automotive frame part according to the present invention, the results of which will now be explained.

Figure 10:
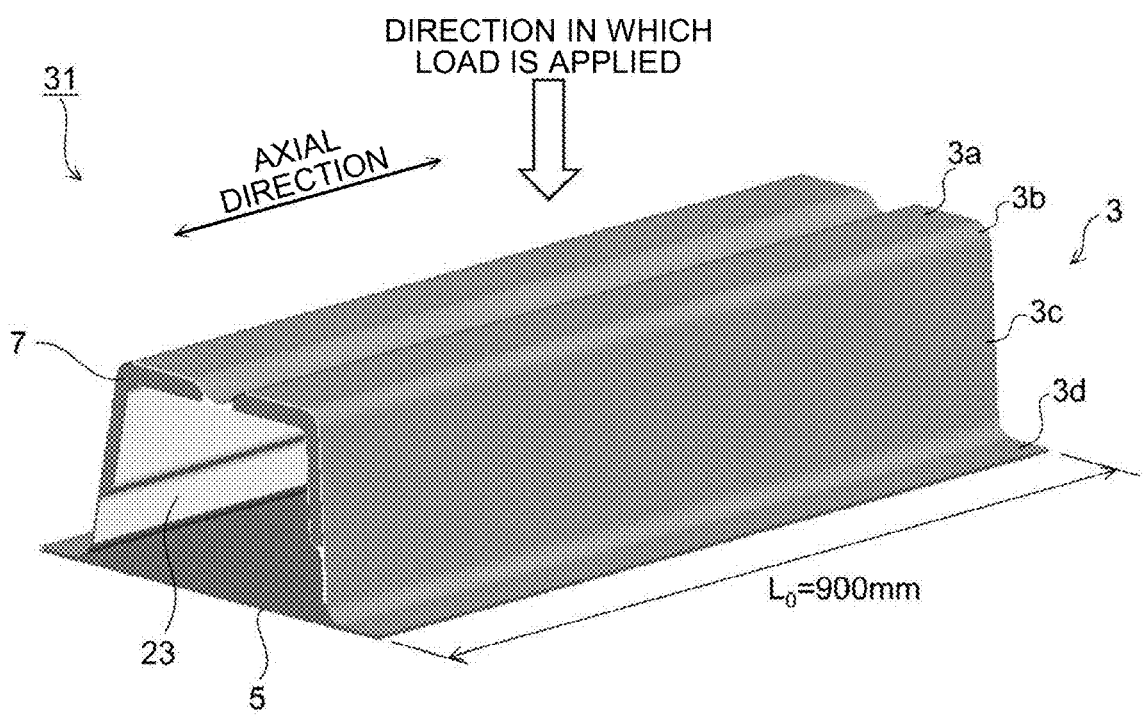
FIG. 10 is a schematic for explaining a methodology for experiments according to examples.

In these examples, experiments were carried out to evaluate the crashworthiness energy absorptive performance of the automotive frame part according to the present invention, during the process in which the automotive frame part bends by receiving a crashworthiness load from a side of the automotive body. In the experiment, a load was applied to a test specimen 31 including the outer part 3 that is the hat-shaped cross section member and the inner part 5 that is the flat plate-like member, in a direction from the outer part 3 toward the inner part 5, as illustrated in FIG. 10, at a speed of 17.8 m/s using a semi-cylindrical punch of R=125 mm. Measurements of a load-stroke curve indicating a relation between the load and the amount of bending deformation (stroke) that took place when the semi-cylindrical punch was pushed into the test specimen 31 by 120 mm were then collected, and an image of the condition of the bending deformation was captured using a high-speed camera. Furthermore, the energy absorbed for a stroke within the range between 0 mm and 80 mm was also acquired from the measured load-stroke curve. The test specimen 31 subjected to the experiment had a length of 900 mm in the axial direction, as illustrated in FIG. 10, and the axial distance between the supports supporting the inner part 5 at the time of the application of the load was set to 720 mm.

Figure 11:
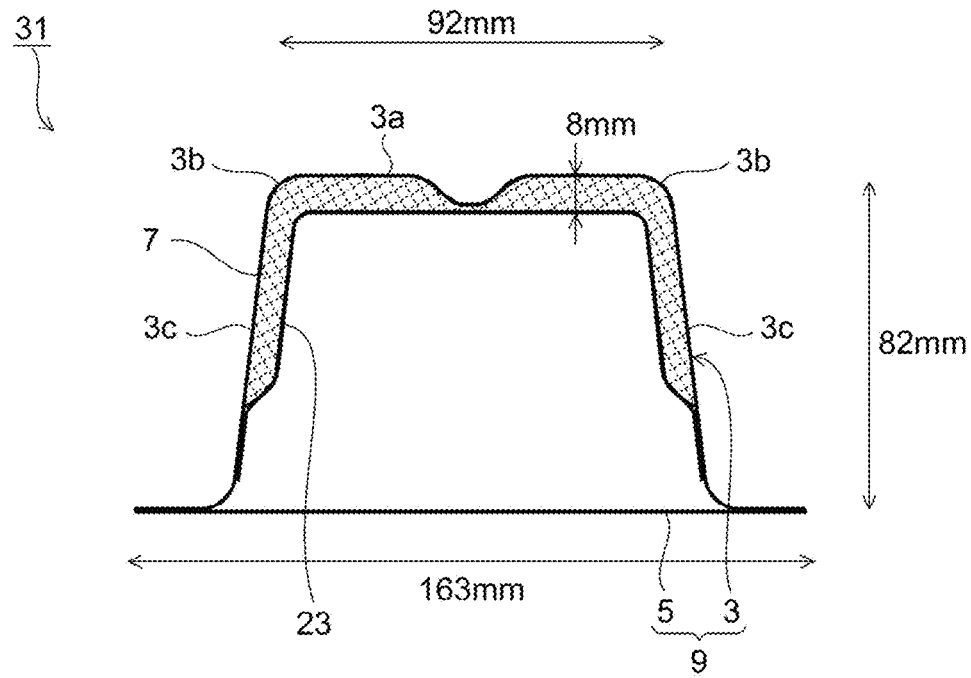
FIG. 11 is a schematic illustrating a structure of a test specimen used as a first example according to the examples.
Figure 12:
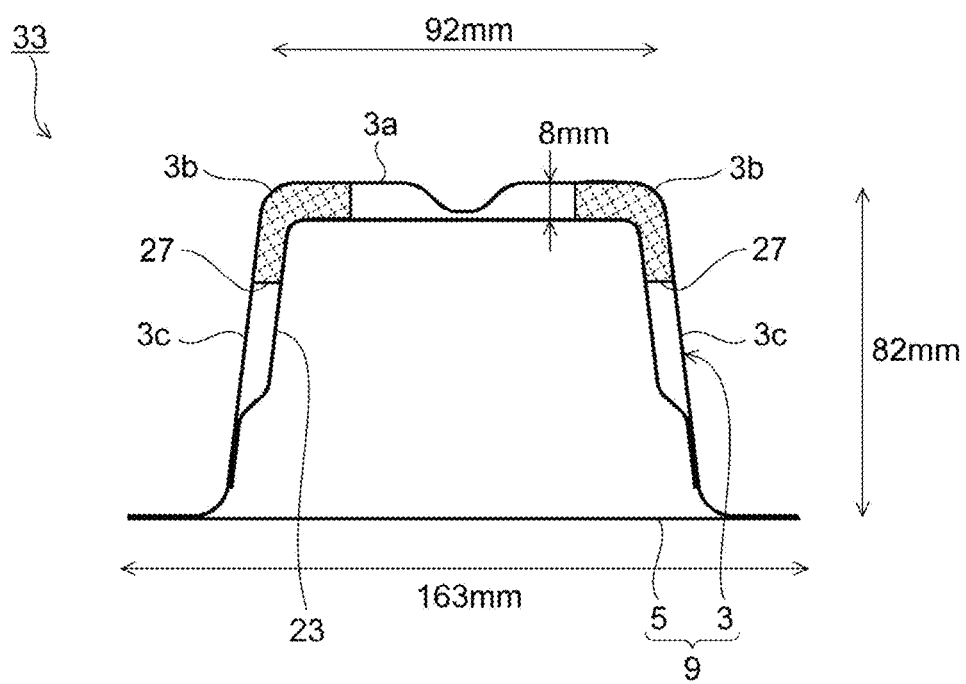
FIG. 12 is a schematic illustrating a structure of a test specimen used as a second example according to the examples.
Figure 13:
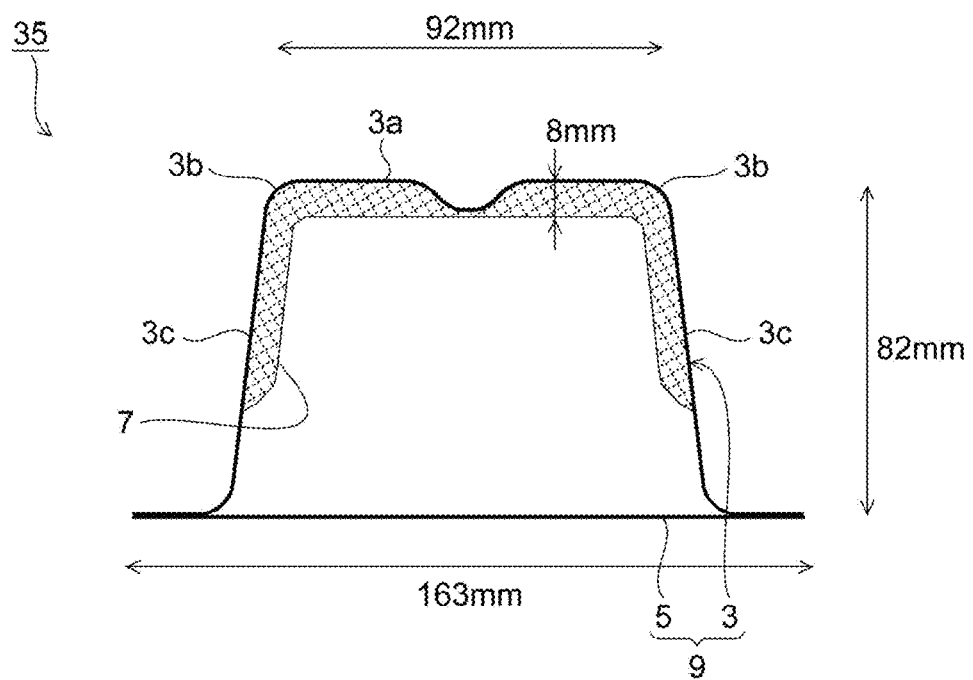
FIG. 13 is a schematic illustrating a structure of a test specimen used as a third example according to the examples.

FIGS. 11 to 13 illustrate structures and shapes of test specimens used as examples. In FIG. 11, the automotive frame part 21 according to the second embodiment of the present invention (FIGS. 7 and 8) explained above was used as the test specimen 31. The test specimen 31 includes the tubular member 9 achieved by joining the outer part 3 and the inner part 5 by spot-welding, and the resin 7 coated on or patched to the internal surface of the top portion 3a, the punch shoulder R portions 3b, and the side wall portions 3c of the outer part 3. The release prevention member 23 is then disposed in a manner straddling over the top portion 3a and covering the resin 7, and has both ends joined to the internal surface of the side wall portions 3c.

In FIG. 12, the automotive frame part 25 according to another mode of the second embodiment of the present invention (FIG. 9) is used as a test specimen 33. The test specimen 33 includes the tubular member 9 achieved by joining the outer part 3 and the inner part 5 by spot-welding, in the same manner as the test specimen 31, and resin 27 is coated or patched in a manner extending by 10 mm toward each of the top portion 3a and both of the side wall portions 3c of the outer part 3, with the punch shoulder R portions 3b therebetween. The release prevention member 23 is disposed in a manner straddling over the top portion 3a and covering the surface of the resin 27, and has both ends joined to the internal surface of the side wall portions 3c.

In FIG. 13, the automotive frame part 1 according to the first embodiment of the present invention (FIGS. 1 and 2) is used as a test specimen 35. The test specimen 35 includes the tubular member 9 achieved by joining the outer part 3 and the inner part 5 by spot-welding, and the resin 7 is coated on or patched to the internal surface of the top portion 3a, the punch shoulder R portions 3b, and the side wall portion 3c of the outer part 3.

The outer part 3 and the inner part 5 used in the test specimen 31, the test specimen 33, and the test specimen 35 illustrated in FIGS. 11 to 13 all have the same shape and the same size, and the axial length Lo of these test specimens were set to 900 mm.

Figure 14:
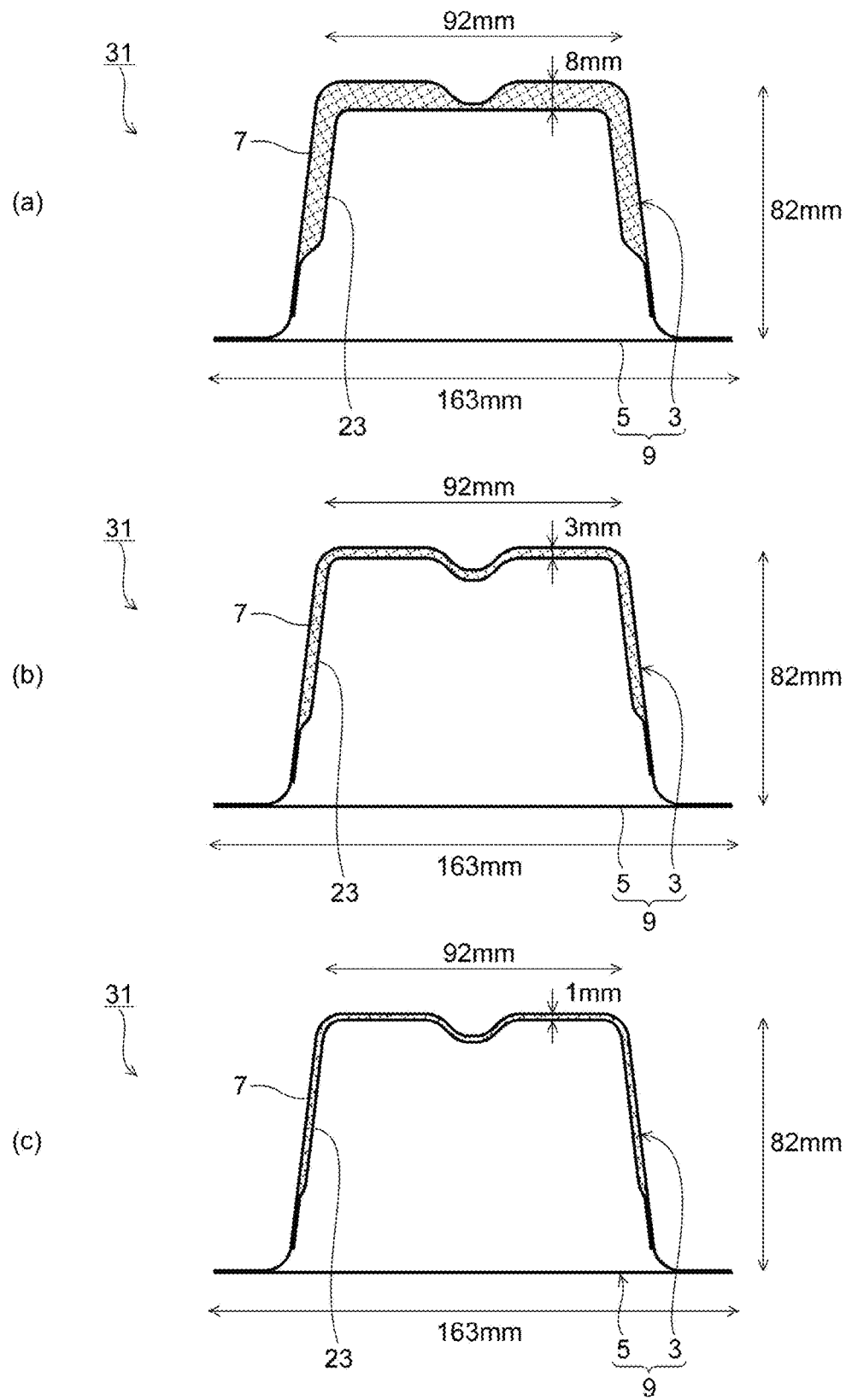
FIG. 14 is a schematic illustrating a structure of a test specimen used as a fourth example according to the examples.

In the test specimen 31, the test specimen 33, and the test specimen 35, one or both of foamed epoxy resin and foamed urethane resin were used as the resin 7 or the resin 27. At this time, the thickness of the coated or patched resin 7 or resin 27 was set to equal to or smaller than 0.1 mm, 1 mm, 3 mm, and 8 mm. FIGS. 14(a) to (c) illustrate the test specimens 31 having thicknesses of the resin 7 set to 8 mm, 3 mm, and 1 mm, respectively.

Furthermore, in the test specimen 31, the test specimen 33, and the test specimen 35, the adhesive strength between the internal surface of the outer part 3 and the resin 7 or the resin 27 was set within the range according to the present invention (10 MPa or higher). As to the adhesive strength in these examples, a boundary condition where the resin peels off was acquired by executing a collision experiment using a double-layered square column including the resin adhering to the metal sheet used for the outer part 3, and a crashworthiness analysis was carried out based on the boundary condition. The maximum sheared stress or the average sheared stress acting on the interface between the metal sheet and the resin, acquired from the crashworthiness analysis, was then used as the adhesive strength.

Furthermore, in these examples, comparative examples were used, and such comparative examples included: an example using a test specimen 41 (FIG. 15) including an outer part and a release prevention member having the same shape and the same size as those of the outer part 3 and the release prevention member 23 according to the examples, but without the coat or the patch of the resin; and examples using the test specimen 31, the test specimen 33, or the test specimen 35 but with the adhesive strength of the resin 7 or the resin 27 lower than 10.0 MPa, being lower than those within the range according to the present invention. Furthermore, an example using a test specimen (FIG. 16) having the same structure as that of the automotive structural part disclosed in Patent Literature 1 was established as a conventional example 1, with foamed resin filled therein, and an experiment was carried out in the same manner as for the examples.

In the test specimen 51 according to the conventional example 1, a reinforce 58 is disposed between the outer part 3 and the inner part 5, and both ends of the reinforce 58 are joined with the reinforce 58 nipped between the flange portions 3d of the outer part 3 and the side ends of the inner part 5. Resin 55 that is a foamed epoxy filler material was caused to adhere to the outer part 3 and the reinforce 58 at a strength of 5 MPa, and resin 57 that is a foamed urethane filler material was filled between but not being caused to adhere to the reinforce 58 and the inner part 5. A test specimen without the use of the reinforce 58 was also prepared as a conventional example 2, using a 1180-MPa class strength steel sheet for the outer part 3.

Table 2 indicates the conditions including the structures, the resin types, and the adhesive strengths of the test specimens used as the examples, the comparative examples, and the conventional examples. For the range of the resin coating specified in Table 2, "outer" indicates the outer part 3, and "punch shoulder R" indicates the punch shoulder R portions 3b of the outer part 3.

TABLE 2

| | | Structure | | | | | | | |
| --- | --- | --- | --- | --- | --- | --- | --- | --- | --- |
| | | Outer Part | | Release Prevention Member | | Inner Part | | Resin Coating | |
| | Test Specimen | Material [MPa] | Thickness [mm] | Material [MPa] | Thickness [mm] | Material [MPa] | Thickness [mm] | With/ Without | Coated or Patched |
| Example 1 | 31 | 590 | 1.2 | 270 | 0.5 | 590 | 1.2 | With | Coated |
| Example 2 | 31 | 590 | 1.2 | 270 | 0.5 | 590 | 1.2 | With | Coated |
| Example 3 | 31 | 1180 | 1.2 | 270 | 0.5 | 590 | 1.2 | With | Coated |
| Example 4 | 33 | 590 | 1.2 | 270 | 0.5 | 590 | 1.2 | With | Coated |
| Example 5 | 31 | 590 | 1.2 | 270 | 0.5 | 590 | 1.2 | With | Coated |

TABLE 2-continued

| | | | | | | | | | |
|---|---|---|---|---|---|---|---|---|---|
| Example 6 | 35 | 1180 | 1.2 | — | — | 590 | 1.2 | With | Patched |
| Example 7 | 31 | 1180 | 1.2 | 270 | 0.5 | 590 | 1.2 | With | Patched |
| Comparative Example 1 | 41 | 590 | 1.2 | 270 | 0.5 | 590 | 1.2 | Without | — |
| Comparative Example 2 | 41 | 590 | 1.2 | 270 | 0.5 | 590 | 1.2 | Without | — |
| Comparative Example 3 | 41 | 1180 | 1.2 | 270 | 0.5 | 590 | 1.2 | Without | — |
| Comparative Example 4 | 41 | 590 | 1.2 | 270 | 0.5 | 590 | 1.2 | Without | — |
| Comparative Example 5 | 41 | 590 | 1.2 | 270 | 0.5 | 590 | 1.2 | Without | — |
| Comparative Example 6 | 41 | 590 | 1.4 | 270 | 0.5 | 590 | 1.2 | Without | — |
| Comparative Example 7 | 41 | 980 | 1.2 | 270 | 0.5 | 590 | 1.2 | Without | — |
| Comparative Example 8 | 31 | 1180 | 1.2 | 270 | 0.5 | 590 | 1.2 | With | Coated |
| Comparative Example 9 | 33 | 590 | 1.2 | 270 | 0.5 | 590 | 1.2 | With | Coated |
| Comparative Example 10 | 31 | 590 | 1.2 | 270 | 0.5 | 590 | 1.2 | With | Coated |
| Conventional Example 1 | 51 | 440 | 1.2 | Reinforce 440 | 0.5 | 440 | 1.2 | Joined Flange | Coated |
| Conventional Example 2 | — | 1180 | 1.2 | — | — | 590 | 1.2 | Without | — |

| | Resin Coating | | Weight of Test Specimen [kg] | Resin Adhesive Strength [MPa] | Resin Type | Fracture | Absorbed Energy at Test Speed of 10 m/s | |
|---|---|---|---|---|---|---|---|---|
| | Thickness [mm] | Range | | | | | [kJ] * | [kJ/kg] |
| Example 1 | 8 | Outer | 5.76 | 11.9 | Urethane | No | 3.6 | 0.625 |
| Example 2 | 1 | Outer | 5.04 | 12.1 | Urethane | No | 2.4 | 0.476 |
| Example 3 | 1 | Outer | 5.18 | 12.5 | Urethane | No | 3.1 | 0.598 |
| Example 4 | 3 | Punch Shoulder R | 5.04 | 11.3 | Epoxy | No | 2.3 | 0.456 |
| Example 5 | 3 | Outer | 5.36 | 31.4 | Epoxy | No | 2.4 | 0.448 |
| Example 6 | 1 | Outer | 4.33 | 12.5 | Urethane | No | 2.8 | 0.647 |
| Example 7 | 0.1 | Outer | 4.86 | 21.5 | Urethane | No | 2.9 | 0.597 |
| Comparative Example 1 | Gap 8 | — | 4.77 | — | — | No | 1.6 | 0.335 |
| Comparative Example 2 | Gap 1 | — | 4.84 | — | — | No | 1.7 | 0.351 |
| Comparative Example 3 | Gap 1 | — | 4.84 | — | — | Yes | 1.8 | 0.372 |
| Comparative Example 4 | Gap 3 | — | 4.82 | — | — | No | 1.8 | 0.373 |
| Comparative Example 5 | Gap 0.1 | — | 4.85 | — | — | No | 1.7 | 0.351 |
| Comparative Example 6 | Gap 8 | — | 5.27 | — | — | No | 1.8 | 0.342 |
| Comparative Example 7 | Gap 8 | — | 4.77 | — | — | Yes | 1.8 | 0.377 |
| Comparative Example 8 | 1 | Outer | 5.18 | 0.0 | Urethane | Yes | 1.9 | 0.367 |
| Comparative Example 9 | 3 | Punch Shoulder R | 5.04 | 4.0 | Urethane | No | 1.8 | 0.357 |
| Comparative Example 10 | 3 | Outer | 5.36 | 9.00 | Epoxy | No | 2.0 | 0.373 |
| Conventional Example 1 | Filled with no Gap | Entirely | 5.88 | Epoxy 8.0 Urethane 0.0 | Epoxy Urethane | No | 2.1 | 0.357 |
| Conventional Example 2 | — | — | 4.21 | — | — | Yes | 1.2 | 0.285 |

* Cumulative value within the stroke of 0 mm to 80 mm.

The examples 1 to 7 are those using the test specimen 31, the test specimen 33, or the test specimen 35 the structures and the adhesive strengths of which are within the range (10 MPa or higher) according to the present invention. Furthermore, the comparative examples 1 to 10 are those using the test specimen 41 (comparative examples 1 to 7) with no resin coating, and those using the test specimen 31 and the test specimen 33 (comparative examples 8 to 10) with resin adhesive strength outside the range according to the present invention (lower than 10 MPa). For the comparative examples 1 to 7 with no resin coating or patch on the internal surface of the outer part 3, the thicknesses of resin coating in Table 2 indicate the gap between the outer part 3 and the release prevention member 23.

Figure 17:
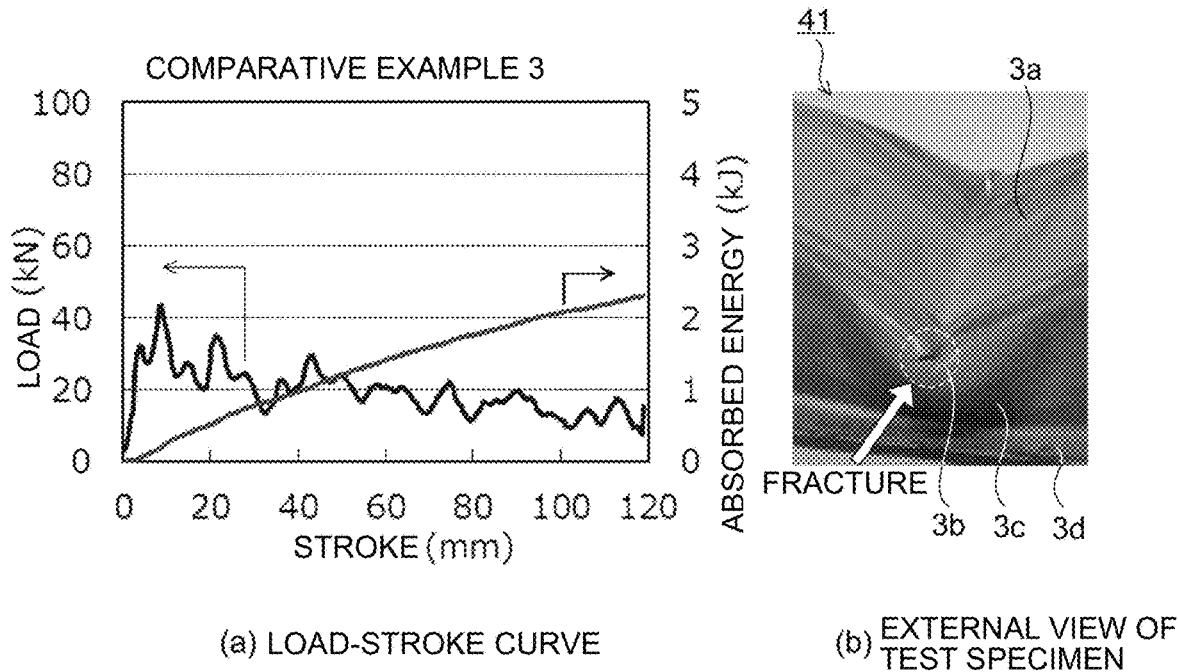
FIG. 17 is a schematic illustrating measurement results of a crashworthiness load and a stroke acquired when an experiment was carried out using the test specimen according to a comparative example in the examples, and the condition of the deformation of the test specimen.
Figure 18:
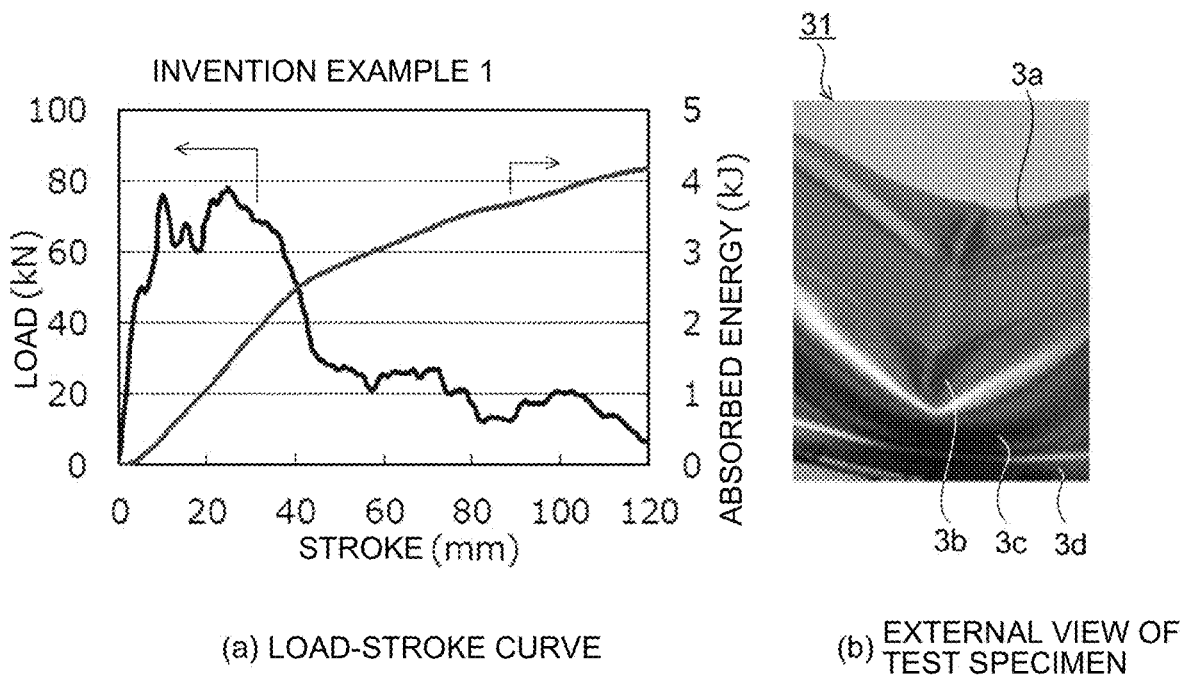
FIG. 18 is a schematic illustrating measurement results of a crashworthiness load and a stroke (the amount of a bending deformation) acquired when an experiment was carried out using the test specimen according to an example in the examples, and the condition of the deformation of the test specimen.

FIGS. 17 and 18 indicate measurements results of the load-stroke curve and the conditions of deformations of the test specimens, when experiments were carried out using the test specimens according to the comparative example 3 and the example 1. In FIGS. 17 and 18, the graph (a) on the left side indicates a load-stroke curve where the horizontal axis represents the stroke (mm) from when a collision of a semi-cylindrical punch was started in the direction perpendicularly intersecting with the longitudinal direction of the test specimen, and the vertical axis represents the load (kN) applied to the test specimen. The photograph (b) on the right side is an image captured at the time when the stroke of the deformation condition of the test specimen reached 80 mm. Furthermore, the absorbed energy plotted with the load-stroke curve indicates the transition of the amount of absorbed crashworthiness energy.

Figure 15:
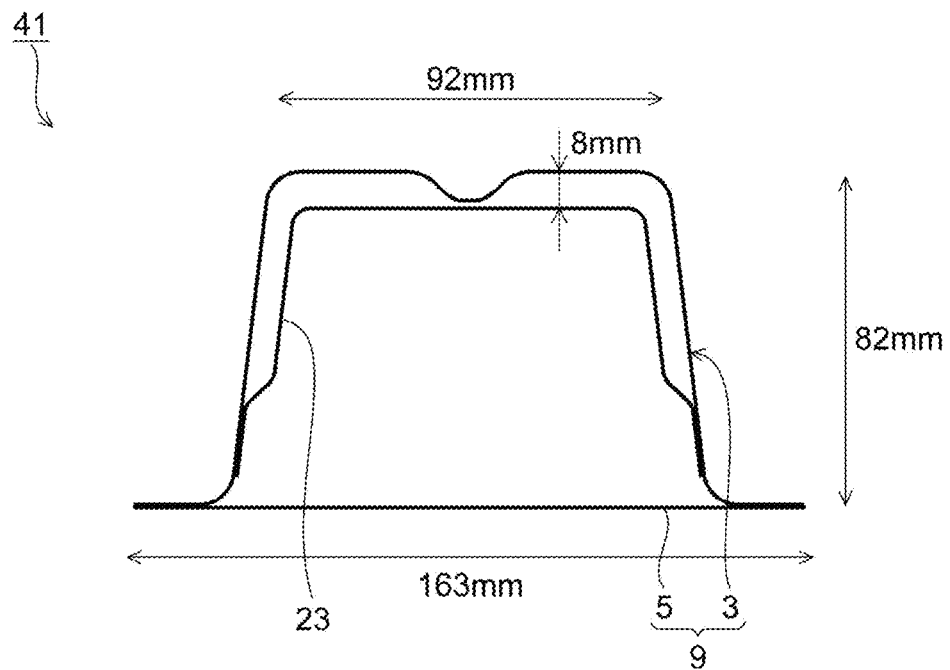
FIG. 15 is a schematic illustrating a structure of a test specimen used as a comparative example in the examples.
Figure 16:
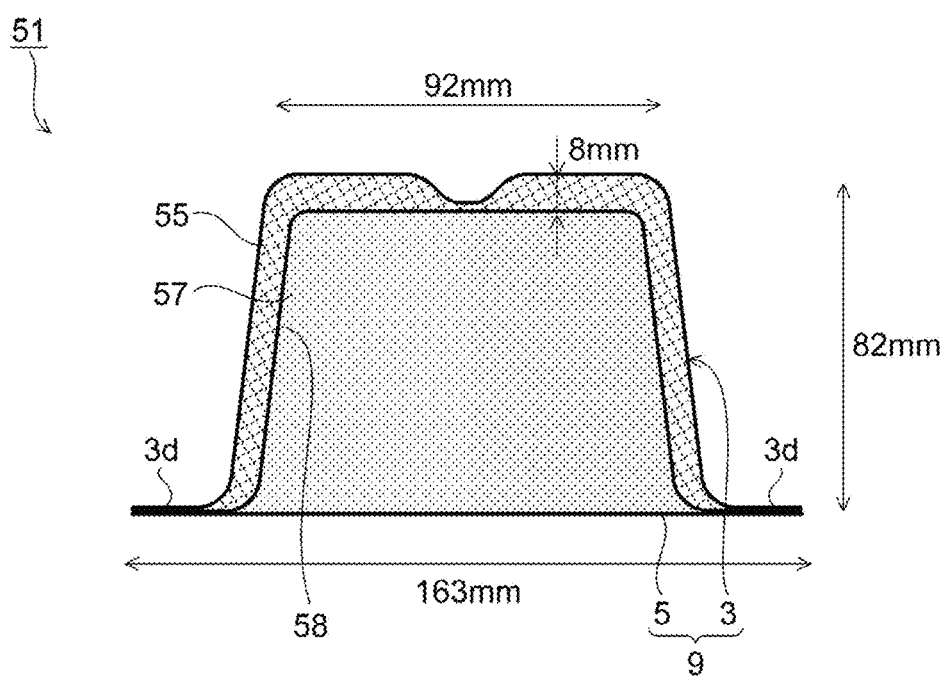
FIG. 16 is a schematic illustrating a structure of a test specimen used as a conventional example in the examples.

The comparative example 3 illustrated in FIG. 17 is an example using the test specimen 41 without the resin coating on the internal surface of the outer part 3 (FIG. 15). The load applied to the test specimen 41 marked the maximum value (approximately 43 kN) at the stroke of approximately 10 mm, and varied in the process in which the outer part 3 bends. As indicated in FIG. 17(*b*), a fracture was observed in the upper part of the test specimen 41. The absorbed energy with a stroke within the range between 0 mm and 80 mm was 1.8 kJ.

The example 1 illustrated in FIG. 18 is an example using the test specimen 31 where the adhesive strength between the resin 7, and the outer part 3 and the release prevention member 23 was set to 11.9 MPa, which falls within the range according to the present invention (10.0 MPa or higher). In the load-stroke curve indicated in FIG. 18(*a*), the load exhibited an extreme value at the stroke of approximately 10 mm, and then marked the maximum value (approximately 78 kN) at the stroke of approximately 30 mm, which was quite a lot of increase from that in a comparative example 4 using a high-strength steel sheet for the outer part 3. Furthermore, although the load dropped after marking the maximum value, the load transited at a higher level than that in the comparative example 4. The absorbed energy with a stroke within the range between 0 mm and 80 mm was 3.6 kJ, which was a dramatic improvement. Furthermore, as indicated in FIG. 18(*b*), no fracture occurred in the outer part 3 in the bending process.

In the manner described above, in the example 1, it can be seen that, because the resin 7 remained without peeling off and becoming released, fractures in the process of bending were prevented, and the load (buckling strength) before the bending took place was also improved, due to the resin 7 coated on the internal surface of the outer part 3, due to the release prevention member 23 disposed in a manner covering the surface of the resin 7, and due to the adhesive strength set to 10 MPa or higher between the resin 7, and to the outer part 3 and the release prevention member 23. Therefore, the crashworthiness energy absorptiveness was improved.

The results of the absorbed energy and the weights of the test specimens obtained by carrying out experiments while changing the structure, the resin type, and the adhesive strength of the test specimen using a stroke within the range between 0 mm and 80 mm are indicated in Table 2 above. The weight of a test specimen indicated in Table 2 represents the sum of the weights of the outer part 3, the inner part 5, the release prevention member 23, and the resin 7 or the resin 27 for the test specimen 31 and the test specimen 33 with the coating of the resin 7 or the resin 27, and represents the sum of the weights of the outer part 3, the inner part 5, and the release prevention member 23 for the test specimen 41 not filled with resin.

The example 1 is an example using the test specimen 31 in which a steel sheet having a 590-MPa class steel sheet strength was used for the outer part 3; the thickness of the resin 7 was set to 8 mm; and the adhesive strength was set to 11.9 MPa, which falls within the range according to the present invention (10.0 MPa or higher) (FIG. 18). In the example 1, no fracture occurred in the bending process, and the absorbed energy was 3.6 kJ, exhibiting a dramatic improvement compared with that in the comparative example 1 (=1.6 kJ). Furthermore, in the example 1, the weight of the test specimen was 5.76 kg. Although the weight increased compared with that of the test specimen in the comparative example 1 having the same shape and the same size but not filled with resin (=4.77 kg), the weight efficiency representing the absorbed energy per unit weight, which is a unit of the absorbed energy divided by the weight of the test specimen, was 0.625 kJ/kg, and improved compared with that in the comparative example 1 (=0.335 kJ/kg).

The example 2 is an example using the test specimen 31 in which a steel sheet having a 590 MPa-class steel sheet strength was used for the outer part 3, and the thickness of the resin 7 was set to 1 mm. In the example 2, no fracture occurred in the bending process, and the absorbed energy was 2.4 kJ, exhibiting a dramatic improvement compared with the absorbed energy in the comparative example 2 (=1.7 kJ). Furthermore, in the example 2, the weight of the test specimen was 5.04 kg, and was lighter than 5.76 kg that is the weight of the test specimen in the example 1. Therefore, the weight efficiency in the example 2 was 0.476 kJ/kg, and improved compared with that in comparative example 2 (=0.351 kJ/kg).

The example 3 is an example using a steel sheet having a 1180 MPa-class steel sheet strength for the outer part 3, in the test specimen 31 having the same shape as that of the example 2. In the example 3, the absorbed energy was 3.1 kJ, exhibiting a dramatic improvement compared with the comparative example 3. Furthermore, in the example 3, the weight of the test specimen was 5.18 kg, which was lighter than that of the example 1. Therefore, the weight efficiency in the example 3 was 0.598 kJ/kg, and improved from the comparative example 3 (=0.372 kJ/kg). In the same manner as in the example 3, in the comparative example 3 using a 1180 MPa-class steel sheet for the outer part 3, the outer part 3 fractured at the time of 80-mm bending, but in the example 3, the outer part 3 did not fracture. This is because the bending radius of the bending portions did not become equal to or smaller than the fracture limit bending radius, because of the resin 7 coated on and caused to adhere to the outer part 3.

The example 4 is an example using the test specimen 33 in which a steel sheet having a 590-MPa class steel sheet strength was used for the outer part 3, and the resin 7 was coated at a thickness of 3 mm, in a manner extending by 10 mm toward the top portion 3a and the side wall portion 3c on both sides of the punch shoulder R portions 3b of the outer part 3. In the example 4, no fracture occurred in the bending process, and the absorbed energy was 2.3 kJ, exhibiting a dramatic improvement compared with the absorbed energy 1.8 kJ in the comparative example 4. In the example 4, the weight of the test specimen was 5.04 kg, and was lighter than that in the example 1. Therefore, the weight efficiency in the example 4 was 0.456 kJ/kg, and improved compared with the comparative example 4 (=0.373 kJ/kg).

The example 5 is an example in which the thickness of the resin 7 was set to 3 mm, in the test specimen 31 having the same shape as that of the example 1. In the example 5, no fracture occurred in the bending process, and the absorbed energy was 2.4 kJ, exhibiting a dramatic improvement compared with the comparative example 4. Furthermore, in the example 5, the weight of the test specimen was 5.36, and was lighter than that of the example 1. Therefore, the weight efficiency in the example 5 was 0.448 kJ/kg, and improved compared with the comparative example 4 (=0.373 kJ/kg).

The example 6 is an example in which the resin 7 was patched to the test specimen 35 at a thickness of 1 mm, without the release prevention member provided. In the example 6, no fracture occurred in the bending process, and the absorbed energy was 2.8 kJ, exhibiting a dramatic improvement from the conventional example 2 (=1.2 kJ). Furthermore, in the example 6, the weight of the test specimen was 4.33 kg, and was lighter than that of the example 1. Therefore, the weight efficiency in the example 6 was 0.647 kJ/kg, and improved from the conventional example 2 (=0.285 kJ/kg).

The example 7 is an example in which the resin 7 was patched to the test specimen 31 at thickness of 0.1 mm. In the example 7, no fracture occurred in the bending process, and the absorbed energy was 2.9 kJ, exhibiting a dramatic improvement from the comparative example 5 (=1.7 kJ). Furthermore, in the example 7, the weight of the test specimen was 4.86 kg, and was lighter than that of the example 1. Therefore, the weight efficiency in the example 7 was 0.597 kJ/kg, and improved from comparative example 5 (=0.351 kJ/kg).

In none of the examples 1 to 7, fractures occurred in the bending process.

The comparative examples 1 to 7 are examples using the test specimen 41 without the resin coating (FIG. 17), and the absorbed energy was 1.6 kJ to 1.8 kJ. The weight efficiency was 0.335 kJ/kg to 0.377 kJ/kg, resulting in lower efficiency than any of those of the examples 1 to 7.

The comparative example 6 is an example using the test specimen 41 without the resin coating, in the same manner as in the comparative example 1, but the thickness of the outer part 3 was changed from 1.2 mm to 1.4 mm. In the comparative example 6, the absorbed energy was 1.8 kJ, exhibiting an increase from the comparative example 1, but was lower than any of those of the examples 1 to 7. The weight efficiency in the comparative example 6 was 0.342 kJ/kg, resulting in lower efficiency than any of those of the examples 1 to 7.

The comparative example 7 is an example in which a 980-MPa class steel sheet was used for the outer part 3, in the test specimen 41 having the same shape as that of the comparative example 1. In the comparative example 7, the absorbed energy was 1.8 kJ, exhibiting an increase from the comparative example 1, but was lower than any of those of the examples 1 to 7. Furthermore, the weight efficiency in the comparative example 7 was 0.377 kJ/kg, and resulted in lower efficiency than any of those of the examples 1 to 7.

The comparative example 8, the comparative example 9, and the comparative example 10 are examples using the test specimen 31, the test specimen 33, and the test specimen 35, respectively, having the same shape as those of the example 3, the example 4, the example 5, and the example 6, but the adhesive strength of the resin 7 or the resin 27 was set outside the range according to the present invention (less than 10.0 MPa). In the comparative example 8, fractures occurred in the process of bending, and the absorbed energy and the weight efficiency both remained low.

The conventional example 1 is an example using the test specimen 51 having the same structure as the automotive structural part disclosed in Patent Literature 1, and the absorbed energy was 2.1 kJ, exhibiting an increase from the comparative example 1 (=1.6 kJ). However, the weight of the test specimen was 5.88 kg, and this was the heaviest among the examples 1 to 7 and the comparative examples 1 to 10. Therefore, the weight efficiency was 0.357 kJ/kg, and did not compared to any of the results achieved by the examples 1 to 7.

Based on the above, with the automotive frame part according to the present invention, it has been indicated that, when the crashworthiness energy is absorbed by bending upon receiving a crashworthiness load from a side, the crashworthiness energy absorptive performance can be improved efficiently, while suppressing an increase in weight.

INDUSTRIAL APPLICABILITY

According to the present invention, it is possible to provide an automotive frame part that is provided to a side portion of an automotive body, and is capable of increasing the crashworthiness energy absorbed by bending of the automotive frame part, upon receiving a crashworthiness load from a side of the automotive body.

REFERENCE SIGNS LIST 1 automotive frame part
3 outer part
3a top portion
3b punch shoulder R portion
3c side wall portion
3d flange portion
5 inner part
7 resin
9 tubular member
11 automotive frame part
13 resin
15 automotive frame part
17 resin
21 automotive frame part
23 release prevention member
25 automotive frame part
27 resin
31 test specimen (example)
33 test specimen (example)
35 test specimen (example)
41 test specimen (comparative example)
51 test specimen (conventional example)
55 resin
57 resin
58 reinforce

The invention claimed is:

1. An automotive frame part for being provided to a side portion of an automotive body and absorbing crashworthiness energy by bending upon receiving a crashworthiness load from a side of the automotive body, the automotive frame part comprising:
   a member having a hat-shaped cross section or a U-shaped cross section, the member including
      a top portion, and
      a pair of side wall portions that are continuous from the top portion via punch shoulder R portions;
   resin that is coated on or patched to an internal surface of the member; and
   a release prevention member that (i) is disposed in a manner straddling over the top portion and covering a surface of the resin, (ii) has both ends joined to internal surfaces of the pair of side wall portions, and (iii) is configured to prevent the resin from being released from the internal surface during a process in which the member bends for ensuring that the resin is nipped on the internal side of the punch shoulder R portions in bending portions of the member,
   wherein
      the coated or patched resin extends at least to a predetermined range toward the top portion and the side wall portions on both sides of the punch shoulder R portions, and
      the coated or patched resin is adhered, after heating, to the internal surface and the release prevention member at an adhesive strength of 10 MPa or higher at a room temperature.

2. The automotive frame part according to claim 1, wherein a tensile strength of the release prevention member is less than a tensile strength of the member.

3. The automotive frame part according to claim 1, wherein the member further includes a pair of flange portions that are continuous with the pair of side wall portions via bottom shoulder portions.

* * * * *